F. D. G. COOK.
ATTACHMENT FOR WHEELED VEHICLES.
APPLICATION FILED AUG. 17, 1908.
926,469.
Patented June 29, 1909.
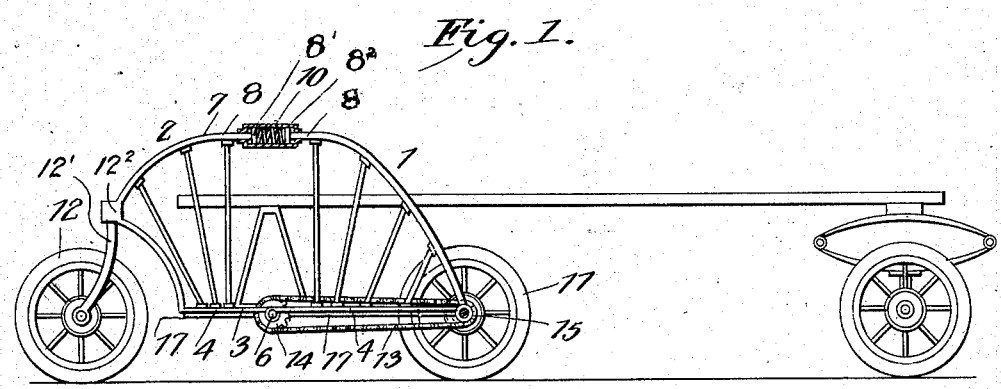
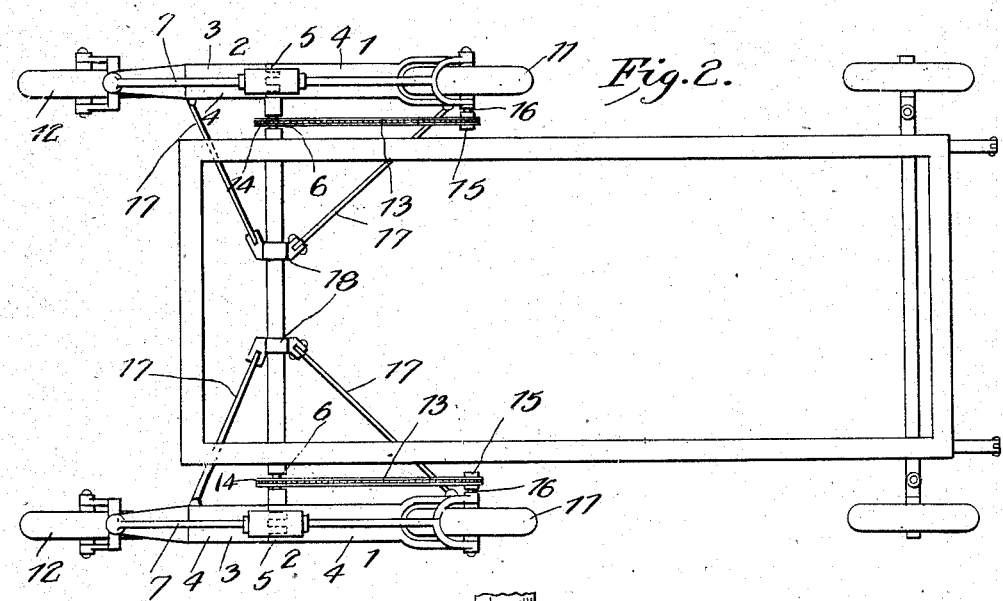
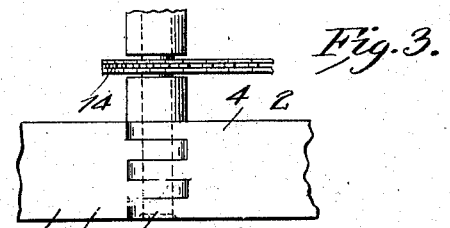
Inventor
Frederick D. G. Cook
Witnesses

UNITED STATES PATENT OFFICE.

FREDERICK D. G. COOK, OF CHIPPEWA FALLS, WISCONSIN.

ATTACHMENT FOR WHEELED VEHICLES.

No. 926,469.      Specification of Letters Patent.      Patented June 29, 1909.

Application filed August 17, 1908. Serial No. 448,889.

*To all whom it may concern:*

Be it known that I, FREDERICK D. G. COOK, a citizen of the United States, residing at Chippewa Falls, in the county of Chippewa and State of Wisconsin, have invented certain new and useful Improvements in Attachments for Wheeled Vehicles; and I do declare the following to be a full, clear, and exact description of the invention, such as will enable others skilled in the art to which it appertains to make and use the same.

This invention relates to new and useful improvements in attachment for wheeled vehicles, and has for its object to provide an attachment of this kind whereby the jar and shock incident to the passage of the vehicle over rough or hilly country, and particularly the shock or jar incurred by the rear wheels may be practically absorbed, thus relieving the occupants of the vehicle of the usual jarring and jolting motion.

With these and other objects in view, the invention consists of certain novel features of construction, combination and arrangement of parts, as will be more fully described and particularly pointed out in the appended claims.

In the accompanying drawings, Figure 1 is a view in side elevation illustrating the application of the attachment to the vehicle; Fig. 2 is a plan view thereof; Fig. 3 is a fragmentary plan view on an enlarged scale showing how the sections comprising the frames are hinged to the main axle.

In the embodiment illustrated the numeral 1 indicates the attachment, which as shown, is arranged to take the place of the rear wheels of the vehicle. This attachment is arranged at both sides of the vehicle and each attachment comprises a supporting frame 2, comprising a lower longitudinally disposed frame bar 3 made in two sections 4 hinged at their meeting ends as at 5, the hinged ends of the lower bar of each frame being adapted to receive one end of the rear axle 6. Each frame also comprises an upwardly curved bar 7 comprising two corresponding tubular sections 8, the inner end of one section terminating in an enlargement 8' which is received by a casing 8² carried by the inner end of the other section. A longitudinally disposed coil spring 10 is arranged in each of said casings to bear against the enlargements of the first mentioned sections and to resist movement of the upper ends of the sections toward each other. Supporting wheels 11 of any suitable form are mounted at the forward ends of said frames, and a pair of wheels 12 mounted in the lower forked ends of suitable bearings 12' swiveled at their upper ends, as at 12², to the rear ends of the side frames. The power is transmitted to the rear axle 6, as usual, in any desired manner, and is transmitted to the front wheels 11 by sprocket chains 13 which run over suitable sprocket wheels 14 at the ends of the main axle and over sprocket wheels 15 at the ends of the axles 16 for the front or driving wheels. Obliquely disposed brace rods 17 are arranged between the ends of the lower frame bar of each frame and between a slidable collar 18 mounted upon the axle 6, the purpose of which will be evident.

In passing over a rough or hilly surface with my improved attachment applied to the vehicle the wheels 11 and 12 are permitted to move relatively to each other by reason of the fact that the lower frame bar sections are hinged at their meeting ends and further because the curved bar sections 8 are also permitted to move toward and from each other, it being understood that the movement of the curved bar sections 7 is resisted by the springs 10. It is also to be observed that by providing a vehicle with my improved attachment the rear driving wheels are located considerably nearer the front of the vehicle than would otherwise be possible and consequently the operator is able to turn the vehicle in a much smaller space.

From the foregoing description taken in connection with the accompanying drawings, it is thought that the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters-Patent, is:—

1. An attachment for vehicles comprising longitudinally disposed wheel-supporting side frames, each comprising two corresponding sections hinged upon the drive axle to move toward and from each other, wheels journaled to the front ends of said frames, wheel supporting bearings swiveled to the rear ends of the side frames and wheels mounted in said bearings with means for driving the front wheels from the main axle.

2. An attachment for vehicles comprising longitudinally disposed side frames arranged at the rear of the vehicle and each comprising two corresponding sections hinged upon the drive axle to move toward and from each other, resilient means tending to resist movement of the upper ends of the frames toward each other, wheels journaled to the front ends of the side frames, wheel supporting bearings swiveled to the rear ends of the side frames and wheels mounted in said bearings with means for driving the front wheels from the main axle.

3. An attachment for vehicles comprising longitudinally disposed side frames arranged at the rear of the vehicle and each comprising two corresponding sections hinged upon the drive axle to move toward and from each other, resilient means tending to resist movement of the upper ends of the frames toward each other, wheels journaled to the front ends of the side frames, wheel supporting bearings swiveled to the rear ends of said frames, wheels mounted on said bearings, means for driving the front wheels from the drive axle, collars mounted to slide upon the drive axle, and obliquely disposed brace rods between the collars and the front and rear ends of the side frames.

4. In combination with a wheeled vehicle, side frames arranged at the rear of the vehicle and extending in advance and in rear of the drive axle, each of said frames comprising a lower frame bar made in two hinged sections and an upper curved bar comprising corresponding tubular sections, the end of one section terminating in an enlargement and the inner end of the other section carrying a casing to receive said enlargement, coil springs arranged in said casings to resist movement of the upper ends of the frame sections toward each other, supporting wheels mounted at the forward ends of the side frames, wheel supporting bearings swiveled to the rear ends of said frames, wheels mounted in said bearings and means for driving said first mentioned wheels from the drive axle.

In testimony whereof I have hereunto set my hand in presence of two subscribing witnesses.

FREDERICK D. G. COOK.

Witnesses:
DAYTON E. COOK,
A. F. BRYCE.